June 18, 1968   J. A. GIORDMAINE ET AL   3,389,269
OPTICAL LIQUID PARAMETRIC DEVICES WITH INCREASED
COHERENCE LENGTH USING DYE
Filed Dec. 27, 1966
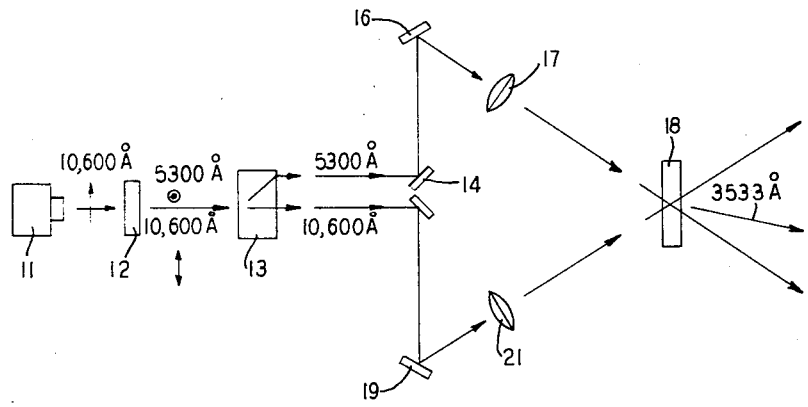
*FIG. 1*
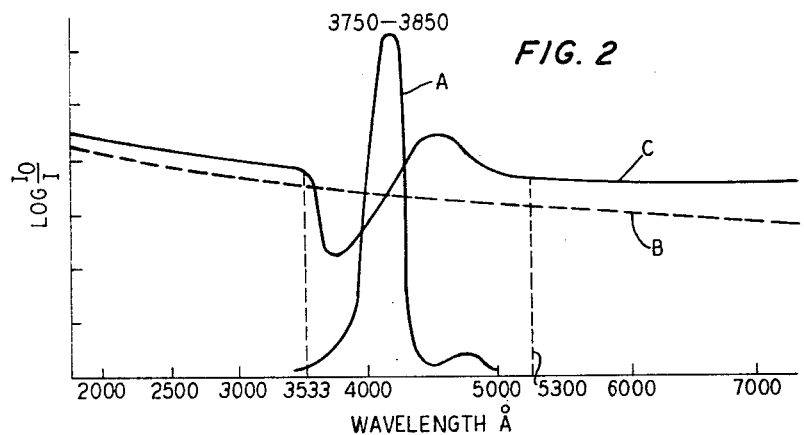
*FIG. 2*
*FIG. 3*
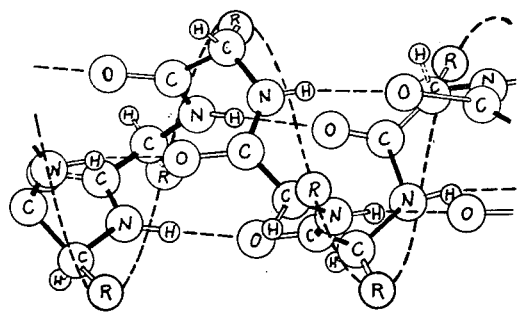
INVENTORS *J. A. GIORDMAINE*
*P. M. RENTZEPIS*
BY
*ATTORNEY*

3,389,269
OPTICAL LIQUID PARAMETRIC DEVICES WITH INCREASED COHERENCE LENGTH USING DYE

Joseph A. Giordmaine, Summit, and Peter M. Rentzepis, Millington, N.J., assignors to Bell Telephone Laboratories, Incorporated, Murray Hill, N.J., a corporation of New York
Filed Dec. 27, 1966, Ser. No. 604,925
5 Claims. (Cl. 307—88.3)

This invention relates to the production of high frequencies through mixing and, more particularly, to optical frequency mixers utilizing pure liquids, liquid solutions, or glasses as the nonlinear medium.

The present state of the art in the generation of coherent optical frequencies is such that there are gaps in the optical spectrum for which no adequate generators have been found. In particular, the high frequency end of the optical spectrum and the extreme low frequency end have not been produced by oscillators with any great degree of success, except for a small number of specific frequencies. The application of optical frequency mixing in nonlinear materials, primarily piezoelectric crystals, to the problem has resulted in some degree of success. However, such processes generally require very special crystals which may be quite expensive to produce, fragile, extremely temperature sensitive, or unavailable in the required large size with high optical quality, or all of these. As a consequence, a material possessing none of these drawbacks would greatly simplify the utilization of the mixing process.

The present invention is based upon the discovery that certain optically active materials having helical or twisted molecules have nonlinear optical properties and, in principle, are capable of operating as the active element in optical mixing. When these materials are used in liquid solution they are neither fragile nor temperature sensitive within a fairly wide range of temperatures, and inherently have high optical uniformity.

Although twisted molecule materials are potentially useful as mixers, there are certain characteristics which limit this usefulness. As in most materials, the index of refraction of the solution increases with frequency, hence when two different frequencies are to be mixed, the resultants of the mixing process cannot, in general, be phase matched over any appreciable length and the output wave resulting is of low intensity or amplitude. One wave resulting from the mixing process is a polarization wave which in turn radiates an electromagnetic wave within the material, and, in general, the coherence length of these two generated waves is quite short through lack of phase matching which, as will be seen hereinafter, tends to reduce the amplitude of the mixer output still further.

In the copending application of Giordmaine and Rentzepis, United States patent application Ser. No. 542,074, filed Apr. 12, 1966, it is explained how increased coherence length can be achieved in solutions by creating within the solution an anomalous index of refraction characteristic which presents substantially the same index of refraction to the two waves that are generated by the mixing process. This is accomplished by the addition of a dye to the solution to create an absorption peak at a frequency lying between one of the input frequencies and the output frequency. The net result is to produce phase matching sufficient to produce a coherent output at the desired frequency that is several orders of magnitude greater than that produced by a solution without the dye. This increased output results from the increased coherence length for the interaction between the polarization wave and the electromagnetic wave which it generates.

In an illustrative embodiment of the invention, a pair of light beams of, for example, 5300 A. and 10600 A. are directed into a solution of material having helical or twisted molecules contained within a fused quartz container at angles to the axis thereof so that they intersect within the liquid. The solution contains a dye which has an absorption peak that lies between 3750 A. and 3850 A. The dye has the effect of altering the index of refraction of the solution so that the phase velocity of the polarization wave and its radiated wave can be made substantially equal. At the region of intersection of the two beams within the solution, mixing occurs and a traveling polarization wave is produced which generates in the solution, and interacts with a free electromagnetic wave of 3533 A. wavelength when the heretofore noted wavelengths are mixed. The output from the solution is, then, an electromagnetic wave that is the sum of the input frequencies. This output may then be directed to any suitable utilization device.

It is a principal feature of the invention that light waves are mixed in a liquid solution composed of a material having twisted or helical molecules in a suitable solvent and which is chemically stable. The solution also may contain a dye having an absorption peak that occurs at a wavelength which lies between the higher frequency wave of the input waves and the generated wave, when the generated wave is the sum of the input waves, and between the lower frequency input wave and the generated wave when the latter is the difference frequency.

The various principles and features of the present invention will be more readily understood from the following detailed description, taken in conjunction with the accompanying drawings, in which:

FIG. 1 is a diagrammatic view of one embodiment of the invention.

FIG. 2 is a diagram illustrating certain of the characteristics of the solution used in FIG. 1.

FIG. 3 is a view of the twisted molecule of poly L-tyrocene.

There are a number of materials that satisfy the criterion of twisted or helical molecules. In general, these materials are chemically stable in solution and hence retain their properties indefinitely. Some of these materials have optical absorption bands in the far infrared portion of the spectrum, while others have absorption bands in the ultraviolet, for example. Thus selection of a particular material for the mixing process must be done with a view to the frequency range of operation.

The materials having helical or twisted molecules operate as mixers because, despite the random orientation of the molecules in solution, there is a definite right or left-hand sense to the solution. As a consequence, the nonlinear effects do not cancel out, and in the presence of optical electric field vectors $E_1$ and $E_2$ at frequencies $f_1$ and $f_2$, respectively, a nonlinear polarization P proportionl to the vector cross product $E_1 \times E_2$ is generated having frequency components $f_1 \pm f_2$. A frequency mixed output at $f_1 \pm f_2$ occurs from the solution.

In FIG. 1 there is shown an arrangement for mixing two frequencies to produce a sum frequency. The 10600 A. output of a neodymium-glass laser 11 is directed into a harmonic generator crystal 12 of lithium metaniobate ($LiNbO_3$) or other suitable material which produces an output beam containing frequencies at 10600 A. and 5300 A., polarized in different directions or senses. This output beam is directed into a beam splitter 13 of calcite or other suitable material where it is divided into two separate beams of 5300 A. and 10600 A. wavelengths. The 5300 A. beam is deflected by mirrors 14 and 16 and focused by a lens system 17 along a path that enters and passes through a liquid solution contained in a fused quartz container as represented by block 18. Other materials for containing the liquid may be used so long as they are transparent to light of the frequency of interest. The 10600 A. beam is deflected by mirrors 19 and 21 and focused by lens system 22 into a path having an angle of incidence with member 18 such that it intersects the 5300 A. beam within the liquid in member 18.

At the region of intersection of the two beams within the liquid, they interact with each other as a consequence of the material being nonlinear, and produce a traveling wave of polarization within the liquid. This polarization wave induces within the liquid, and interacts with, a free electromagnetic wave of 3533 A. wavelength, which corresponds to the sum frequency of the two input waves. The direction of the induced wave is such as to satisfy the $k$ vector relationship common to mixing and parametric processes.

In a solution of the type used in the embodiment of FIG. 1, which may be, for example, a solution of hexahelicene and benzene, the index of refraction varies with frequency as it does in most optical materials, as shown by curve B in FIG. 2, which is a graph of refractive index and optical density $I_0/I$, where $I_0$ is the magnitude of the incident light and I is the magnitude of the transmitted light, versus wavelength in angstroms. Curve B is only intended to depict the shape and approximate magnitude of the index of refraction characteristic, and no numbers have been assigned thereto. As a consequence, the coherence length or mixing volume of the two incident beams is quite small, although mixing does occur to produce an output at 3533 A. In order to achieve a greater coherence length, a dye such as tetracene is added to the solution. This dye creates an anomaly in the index of refraction curve of the solution. In FIG. 2, curve A is the absorption characteristic of the dye which has a peak in the region of 3800 A. The solid curve C is the index of refraction characteristic for the solution after the dye has been added. It can be seen that the presence of the dye creates an anomaly in the index of refraction in the region of the absorption peak. At shorter wavelengths, the index of refraction of the solution, because of the dip caused by the dye, is less than for the undyed solution. Thus the index of refraction at 3533 A. is less than it normally would be and with a properly chosen dye, can be made equal to the index of refraction for the polarization wave. In addition, the indices of refraction for the 10600 A. and 5300 A. waves are made substantially the same, thereby increasing their interaction length of volume. Phase matching and hence increased coherence length occur for the generated waves, with a consequent increase in output intensity at 3533 A., the sum frequency.

While the curves of FIG. 2 are particularly applicable to hexahelicene in solution with benzene used with the dye tetracene, the characteristics of other materials having twisted molecules such that they have, in solution, a definite left- or right-hand sense, are similar. Such materials as 1-fluoro-1,2-methylbenzo [c] phenanthrene, and L-tyrocene in solution behave in a similar manner. An example of the twisted molecule of poly L-tyrocene is shown in FIG. 3. Certain other materials which ordinarily do not have twisted molecules, such as poly δ-ethylglutamate may be treated with materials such as perchloric acid to produce twisted molecules.

It is possible, at least to some extent, to enhance the phase matching and coherence length of the materials by the application of D.C. electric or magnetic fields, which tend to align or orient the molecules in the solution, thereby introducing birefringence and allowing an increase in coherence length by well-known techniques.

The foregoing has dealt with mixing two input waves to produce a sum frequency output. In any mixing process, both sum and difference frequencies are produced. The principles of the invention are, of course, applicable to the production of difference frequencies also. This is especially useful at the lower end of the optical spectrum where there exists a gap between the high microwave frequencies and the far infrared frequencies. This gap can be filled to a large extent by utilizing the principles of the present invention. In addition, because nonlinear three-frequency processes are involved, other functions such as parametric oscillation, amplification, and modulation are possible.

The foregoing has been intended to illustrate the principles of the invention. Numerous other embodiments and applications of these principles may occur to workers in the art without departure from the spirit and scope of the invention.

What is claimed is:

1. A high frequency mixing arrangement comprising a liquid solution having a chemically stable constituent characterized by a twisted molecule, means for directing first and second light beams into said solution at an angle to each other such that said beams intersect within the solution and mix to produce a polarization wave and a free wave within the solution, and means within the solution for increasing the coherence length of the produced waves comprising a substance having an absorption peak which occurs at a wavelength lying between the wavelengths of the generated waves and the higher frequency wave of said first and second light beams.

2. A high frequency mixing arrangement as claimed in claim 1 wherein said chemically stable constituent is hexahelicene.

3. A high frequency mixing arrangement as claimed in claim 1 wherein said means for increasing coherence length is the dye tetracene.

4. A high frequency mixing arrangement as claimed in claim 3 wherein the wavelength of said first beam is 5300 A., the wavelength of the second beam is 10600 A., the wavelength of the generated free wave is approximately 3533 A., and the absorption peak of the dye lies between 3750 A. and 3850 A.

5. An optical frequency mixer comprising an optically active, chemically stable liquid solution, containing a material having twisted molecules, means for generating first and second optical beams of different wavelengths, means for directing said beams at an angle to each other to an intersection point within the solution, and means for producing an anomaly in the index of refraction characteristic of the solution comprising a dye contained within the solution having an absorption characteristic such that the index of refraction of the solution for waves generated by the intersection of the beams is approximately the same for each of the waves.

No references cited.

ROY LAKE, *Primary Examiner.*

D. R. HOSTETTER, *Assistant Examiner.*